United States Patent [19]
Chou et al.

[11] Patent Number: 5,351,757
[45] Date of Patent: Oct. 4, 1994

[54] METHOD FOR SILICA GEL EMPLACEMENT FOR ENHANCED OIL RECOVERY

[75] Inventors: Shang Chou; Jae Bae, both of Anaheim, Calif.

[73] Assignee: Chevron Research and Technology Company, San Francisco, Calif.

[21] Appl. No.: 993,478

[22] Filed: Dec. 18, 1992

[51] Int. Cl.$^5$ .................... E21B 33/138; E21B 43/20; E21B 43/22
[52] U.S. Cl. .................... 166/270; 166/273; 166/292; 166/300
[58] Field of Search ............... 166/268, 270, 272, 273, 166/292, 300

[56] References Cited

U.S. PATENT DOCUMENTS

| | | | |
|---|---|---|---|
| 2,402,588 | 6/1946 | Andresen | 166/270 |
| 3,261,400 | 7/1966 | Elfrink | 166/292 |
| 3,285,338 | 11/1966 | Boston | 166/270 |
| 3,310,110 | 3/1967 | Martin | 166/292 |
| 3,386,509 | 6/1968 | Froning | 166/292 |
| 3,396,790 | 8/1968 | Eaton | 166/270 |
| 3,645,336 | 2/1972 | Young et al. | 166/292 X |
| 4,428,424 | 1/1984 | Lacy et al. | 166/292 X |
| 4,676,318 | 6/1987 | Myers et al. | 166/292 X |

*Primary Examiner*—George A. Suchfield
*Attorney, Agent, or Firm*—W. K. Turner; M. W. Carson

[57] ABSTRACT

A method for emplacing a silicate gel to improve the sweep efficiency of a water, gas, or steam flood operation by reducing the permeability of high-permeability thief zones is disclosed. Controlled quantities of a silicate solution and either a gas or a gas and an organic acid are injected into a well to infiltrate and generate a controlled amount of a silicate gel of a controlled $SiO_2$ concentration in the high-permeability thief zones, to reduce the permeability thereof. Base agents and weak acids may be added to control gel generation rate. Methods for selective emplacement of silicate gels into thief zones through a well without selective injection facilities are also disclosed.

13 Claims, No Drawings

METHOD FOR SILICA GEL EMPLACEMENT FOR ENHANCED OIL RECOVERY

BACKGROUND OF THE INVENTION

This invention relates to the recovery of oil from subterranean reservoirs and more particularly concerns an improved process for recovering oil from porous reservoirs having heterogeneous permeability, utilizing the injection of a silicate solution.

Significant quantities of crude oil exist in underground formations. These substantial amounts remain even after completion of primary recovery operations. Because of this, techniques have been developed for stimulating production from such reservoirs. Such methods include water flooding, gas flooding, steam injection, foam emplacement, and polymer gel emplacement, but none to date have been very successful. Poor sweep efficiency has been a concern in many gas floods and mature waterfloods. Because of reservoir heterogeneity, the injected water or gas tends to flow through the more permeable sands, leaving a significant portion of oil in the less permeable sands unrecovered. The objective of this invention is to recover that ordinarily unrecoverable oil by improving the sweep efficiency of water, gas, or steam in the reservoir.

Generally, water flooding is ineffective for displacing the oil, because of the high oil-water interfacial tension and the rich viscosity of the oil. Steam injection lowers the viscosity of the oil, but requires the availability of inexpensive fuel and a large supply of clean water.

The areal sweep efficiency of carbon-dioxide recovery can be increased by generating a foam in situ to block the highly permeable features of the underground formation. U.S. Pat. No. 3,342,256, issued to Bernard et al., discloses alternative methods for generating foam in situ to prevent channeling of carbon dioxide into high permeability channels away from the zone to be treated. A subsequently injected drive medium, such as water, forces the carbon dioxide-surfactant mixture through the formation to a production well where production continues until the produced fluids exhibit an undesirably high water/oil ratio. Production is then terminated, and the formation is depressurized to allow dissolved gases to come out of solution and form the foam. As the foam expands, it drives additional oil towards the producing well.

Relying upon gases released in low pressure zones to generate the foam, however, presents certain disadvantages. When the foaming agent is dissolved directly into carbon dioxide or into carbonated water, a large portion of the gaseous carbon dioxide released in the low pressure zone does not go to generating foam, but is preferentially absorbed into the crude. And if the released carbon dioxide migrates into a high pressure region, solubility of carbon dioxide is increased and may approach miscibility at pressures in excess of about 700 psig. These difficulties are not encountered if the foaming agent is dissolved in a hydrocarbon vehicle, but the cost of liquid hydrocarbons is generally prohibitive. Moreover, a hydrocarbon-soluble surface-active agent generally emulsifies the oil and restricts its movement through the reservoir. The upshot is that increasing the areal sweep efficiency of the recovery method by generating foam in situ is much more difficult and expensive in the reservoir than laboratory results might otherwise indicate.

Polymer gels are known in the industry, as described in U.S. Pat. No. 5,079,278 issued to Mitchell, and U.S. Pat. Nos. 4,928,766, 4,981,520, and 5,028,344 issued to Hoskin. U.S. Patent Nos. 4,009,755, 4,069,869, and 4,413,680 issued to Sandiford, teach methods of injecting a polymer and an alkaline metal silicate to form a plug to reduce permeability of a selected zone. However, several factors limit the effectiveness and feasibility of polymer gel treatments. One is that the polymer solution generally has a higher viscosity than the reservoir fluid. As a result, the polymer solution tends to enter the lower permeability sands proportionately more than the higher permeability sands. When polymer gels are subsequently formed in situ, they may reduce the permeability of the tighter sands to a greater extent, resulting in worse injection or production profiles than before the gel treatment. Not surprisingly, many polymer gel treatments attempt to confine polymer injection into selective zones of high-permeability sands. This requirement excludes many potential applications because of the mechanical condition of the wells. Also, knowledge of the location and size of the high-permeability sands is essential for successful treatments.

The second limitation is that polymer gels are normally set in a few hours. This necessitates the use of experienced service companies with dedicated equipment to conduct gel treatments; it also limits the treatment volume to a few hundreds of barrels in most cases. The depth of gel invasion in the reservoir, while dependent on such variables as sand thickness, permeability distribution, polymer and reservoir fluid viscosities, and fluid saturations in the reservoir, is typically less than 40 ft. The effectiveness of such near-wellbore treatments is limited if the reservoir has some degree of cross-flow.

U.S. Pat. No. 2,081,541 teaches a method of sand control by injecting a mixture of silica acid, $ZnCl_2$ and $NH_3$, followed by injection of an inert gas to dispel $NH_3$ and to solidify the mixture.

U.S. Pat. No. 3,741,307 teaches a method of controlling the gelation time of a silica gel comprising sodium silicate and a weak acid, by adjusting the pH.

The prior work is limited in the attempts at silica gel emplacement. No suitable method has been disclosed which injects a silicate solution and either a gas or a gas and an organic acid to form a controlled amount of a silicate gel in high-permeability thief zones, to reduce the permeability thereof.

SUMMARY OF THE INVENTION

The present invention is surprisingly successful in providing a method for improving the sweep efficiency of a water, gas flood or a steam flood by reducing the permeability of higher permeability thief zones of a hydrocarbon bearing reservoir having heterogeneous and/or fracture permeability that is penetrated by at least one well.

Controlled quantities of a silicate solution and either a gas or a gas and an organic acid that is soluble in the gas are injected into the well to generate a controlled amount of a silicate gel of a controlled quality in the high permeability thief zones to reduce the permeability thereof.

It is preferred that a controlled quantity of a base agent is also injected and that the pH of the silicate solution is high enough to prevent premature gel generation prior to injection of the gas or the gas and acid, and that the concentration of silicon oxide in the silicate solution ranges from 1.1% to 10.0%.

In another embodiment, a controlled quantity of a weak acid is added to the silicate solution to maintain the pH of the silicate solution below about 11 and above about 9 to accelerate silica gel generation.

The above and other embodiments, objects, advantages, and features of the invention will become more readily apparent from the following detailed description of the invention.

DETAILED DESCRIPTION OF THE INVENTION

The present invention provides a new and improved method of silica gel emplacement for improving the sweep efficiency of a gas, steam, or waterflood enhanced oil recovery operation by reducing the permeability of higher permeability thief zones of a hydrocarbon bearing subterranean reservoir that has heterogeneous and/or fracture permeability.

It is preferable to select a proper subterranean reservoir for silica gel emplacement that will effectively plug off thief zones, that has been penetrated by at least one well. While a producing well of a steam, water, or gas flood enhanced oil recovery operation is the more likely candidate, the inventive method may also be successfully applied to injection wells that penetrate the subterranean reservoir.

Thief zones are those overly permeable portions of a formation that are known or suspected to allow an undesirably large fraction of injected fluid to escape, rather than flow through the bulk of the formation. In the absence of thief zones, it is highly probable that conventional polymer gels may reduce oil recovery by plugging productive zones unless they can be selectively placed in the thief zones by using mechanical devices in the well.

In gas flood treatments suitable injector wells are typically those wells that have disproportionately high gas production rates in one or two offset producers (herein defined as problem producers), along with a significantly higher injectivity than other wells in the field. Gel should be emplaced when oil is largely depleted in thief zones, because (1) gel stability is reduced by the presence of oil, and (2) the oil present in the thief zone would not be recovered if gel is injected early. The problem producers should have a high gas-oil ratio, at least 10, preferably over 100. Furthermore, the tertiary oil production is presumed to have peaked in the problem producers.

It is one advantage of the inventive method that the well to be treated need not have selective injection facilities. In the preferred embodiment, a controlled quantity of a silicate solution is injected into the selected well, preferably in the form of a slug, near at least one higher permeability (thief) zone. The proximity to the high permeability zone can be easily calculated by one of ordinary skill in the art. Injection methods are also well known. A sodium silicate solution has approximately the same viscosity as water. It is preferable that the silicate solution has a pH that is high enough to prevent the generation of the silica gel until the proper amounts of a gas or a gas and an organic acid have been injected as well. Sodium silicate solution does not generally gel until its pH is brought below 10.

It is preferable that the alkaline silicate solution, such as sodium silicate (such as N-sodium silicate manufactured by PQ Corp. ™) along with 0.5% to 2% of a weak acid such as ammonium sulfate have a concentration of $SiO_2$ of from about 1.1% to about 10.0%. It has been determined that contiguous silicate gel is formed only above a critical $SiO_2$ concentration of about 0.9%.

In another embodiment of the invention, the silicate solution further comprises a controlled quantity of a base agent, such as sodium hydroxide or sodium oxide, so that the pH of the silicate solution is maintained at a high enough level to prevent the generation of a silicate gel until a desired time, such as subsequent to an injection of a gas or a gas and an organic acid. The needed quantity of the base agent may easily be calculated by one of ordinary skill in the art.

In another embodiment, the silicate solution further comprises a controlled quantity of a weak acid, such as ammonium sulfate so that the pH of the silicate solution is maintained below about 11 and above about 9 to accelerate the generation of the silicate gel, if desirable. Weak acids and their optimum concentrations are well known in the art.

Either following or prior to the injection of the silicate solution, in one embodiment of the invention controlled quantities of a gas and an organic acid that is soluble in the gas are injected into the well near the selected high permeability zone, so that a controlled amount of a silicate gel of a controlled quality is generated in the high permeability thief zone, so that the permeability thereof is reduced.

Any gas useful in gas flood operations may be injected, such as $CO_2$ or $N_2$ or a natural (hydrocarbon) gas, or a mixture of these gases. Acetic acid is an especially effective acid that is soluble or dispersible in such a gas.

The silicate gel sets up in the thief zone to reduce the permeability thereof, thereby improving the sweep efficiency of the oil recovery process being conducted in the reservoir, subsequent to the inventive method. The thief zone is eliminated or at least greatly reduced. The gel preferentially forms in the thief zones because the injected gas preferentially enters the thief zones.

Silicate gelation time can vary from a few hours to over 30 days. The gel forms a network in porous media, having its own permeability that is typically less than one milli-Darcy. The gel is durable to water injection at moderate pressure gradients. In one experiment it lasted over 90 days under water injection at 25 psi/ft. Silicate gel has been found to degrade at an accelerated rate above a critical pressure gradient (approximately 100 to 500 psi/ft depending on the $SiO_2$ concentration and the presence of other components in the gel).

The volume of gel that needs to be generated is determined by reservoir characteristics. If the reservoir is fractured, the fracture half-length (X), in feet and height (H), in feet is calculated from pressure transient tests and reservoir geology. From this, the preferred gel volume is calculated using the following equation:

$$\text{Gel volume (ft}^3\text{)} = 4 \cdot X \cdot H \cdot \phi$$

Where $\phi$ is rock porosity.

If the reservoir is unfractured, it is necessary to determine the thickness of high-permeability thief zones (H). The gel volume is then calculated using the following equation:

$$\text{gel volume (ft}^3\text{)} = 300 \cdot H \cdot (\phi)$$

From the desired gel volume and the nominal injection or production rate of the treatment well, one can easily determine the time required to inject the desired quantity of silicate solution and hence, the gelation time, as well as the required quantity of base or weak acid in the silica solution.

In another embodiment of the invention, in addition to the injection of a controlled quantity of a silicate solution (such as those described above) into a well, controlled quantities of an acidic gas are also injected (either prior to or subsequent to silicate solution injection), whereby the gas causes a controlled quantity of a silicate gel of a controlled quality to be generated in the high permeability thief zone, thereby reducing the permeability thereof.

It is preferable to select a gas from the group $CO_2$, $N_2$, $H_2S$, natural gas, or a mixture of these gases. Injection may be into a producing well or an injector well. In this embodiment, silicate gel forms as the gas mixes with the silicate solution in situ and cause the pH of the silicate solution to drop.

In the preferred embodiment for treating gas flood injectors, as an example, one gel emplacement program is as follows:

(1) inject 250 bbl of 3% sodium silicate (having a $SiO_2/Na_2O$ weight ratio of 3.22) and 1% ammonium silicate at 500 bbl/day into a gas injector well at the end of a water cycle (assuming the gas flood is operated as a water-alternating-gas program);
(2) inject 250 reservoir bbl equivalents of $CO_2$ at 1000 bbl/day or co-inject 250 bbl of gas and 10 bbl of acetic acid at 1000 bbl/day;
(3) shut-in the gas injector well for 48 hours; and
(4) resume gas injection.

The inventive method is most effectively utilized by varying the technique according to whether the well is a producer or an injector, and the type of flooding operations in place, as described below. Of particular importance is the timing and the sequence of fluid injection which accomplishes selective gelation in the high-permeability thief zones, by utilizing the mechanism of silicate gelation.

CO<sub>2</sub> Flood Producers

In $CO_2$ floods, some producers may experience very fast $CO_2$ breakthroughs due to high-permeability thief zones in the reservoir. Water in these zones should have a pH of about 3.5 and in the rest of the reservoir about 8. Alkaline silicate solutions (pH 12.5 to 13) injected into these fast-breakthrough wells will be gelled in the thief zones but not elsewhere in the reservoir, because the pH there is not sufficiently low to induce gelation. Silicate solutions injected into the bulk of the reservoir will be simply washed out when the well is back on production. Thus, one can achieve selective gelation in the thief zone without the capability of selective injection and, in fact, without any knowledge of the size or location of the thief zone.

The best timing for silicate gel treatment is soon after $CO_2$ breakthrough in the producers. In later stages of a $CO_2$ flood, the pH of the reservoir water near the producer may be low enough to cause gelation indiscriminately. To achieve selective gel placement in this case, the silicate solution can be formulated to a higher pH, and a slug of water can be injected immediately after silicate injection. This reduces the $SiO_2$ concentration in the tighter sands to below the critical $SiO_2$ concentration needed for gelation, by dispersive mixing. Such mixing is more significant in tighter sands where the mixing length relative to the silicate slug size is greater.

CO<sub>2</sub> Flood Injectors

Treating $CO_2$ flood injectors is more involved. Injectors connected with significant thief zones need to be identified. These usually are characterized with high injection rates and high $CO_2$ production rates in one or two offset producers. Most $CO_2$ floods are conducted as a WAG (water alternate gas) process. In this case, silicates should be injected near the end of a water cycle. The equal mobility between water and silicate solution allows the latter to be distributed in the reservoir proportional to the permeability of each sands. Subsequently, a slug of $CO_2$ is injected and then the well is shut in for one to three days to set up gel in place. Because $CO_2$ has a much lower viscosity than water, it preferentially enters the high-permeability sands. The $CO_2$ injection rate should be made as high as permissible (without fracturing the well) to enhance $CO_2$ fingering into the high permeability thief zones. The size of this $CO_2$ slug should be made large enough to lower the pH and, hence, set up gels in the more permeable sands, but not in the tighter sands.

Hydrocarbon Gas Flood Injectors or Producers

The strategy of applying silicate gels in hydrocarbon gas floods is basically the same as that in $CO_2$ floods. However, because hydrocarbon gas by itself would not cause gelation of silicates, some modification of the technique is needed. The key is to make the gas acidic, which can be accomplished by adding a small amount of organic acids, such as acetic acid, to the hydrocarbon gas. As discussed below, this complexity may be used to advantage to achieve selective gel placement in the reservoir.

In treating injectors, silicate solutions should be injected near the end of a water cycle (for a WAG [water alternate gas] process) and the acid should be dissolved or dispersed in gas and injected immediately after silicate injection. This injection sequence allows more acids to be placed into higher permeability sands. A slug of gas without acid is then injected to displace the acid-silicate mixture away from the wellbore. It also serves to lower the acidity in the tighter sands. The well is then shut in for one to three days to allow in situ gelation.

In the treatment of a producer, the acid should be dissolved in gas and injected soon after gas breakthrough in the producer. Thus, the dissolved acid tends to enter higher permeability sands having a higher gas saturation. A slug of silicate solution is subsequently injected, and the well is shut in for one to three days to allow gelation to take place. Gel tends to be formed in high-permeability sands where the pH is sufficiently low for gelation. Silicates injected into the tighter sands are washed out when the well is back on production.

Waterflood Injectors or Producers

In a mature waterflood in heterogeneous reservoirs, water has swept clean the high-permeability sands, but not the tighter sands. In regions close to the producing well, high-permeability sands are near the residual oil saturation, whereas low-permeability sands are near the connate water saturation. When silicate solutions are injected through a producer, they preferentially enter the higher permeability sands where the permeability to water is higher. To set up gel in situ, the silicate solution can be formulated to an appropriate pH by adding weak acids (such as ammonium sulfate) so that it will be gelled in time.

Selective emplacement of silicate gels into high-permeability sands through a waterflood injector can also be achieved. Reservoir sands near the injector are fully saturated with water, and the injected silicate solution tends to be distributed proportional to the permeability of each sand. A suitable amount of silicate solution is injected such that the $SiO_2$ concentration in the low-permeability sands, upon dilution and reaction with reservoir brine, is below the critical $SiO_2$ concentration needed for gelation. A slug of water may also be injected after silicate injection to augment the effect of dilution. The $SiO_2$ concentration in the higher-permeability sands is less affected by dilution because of the deeper penetration of silicate solution there. Thus, gel tends to be formed mostly in high-permeability sands. This placement technique works best in injectors connecting to a major thief zone.

Various embodiments and modifications of these inventions have been described in the foregoing description, and further modification will be apparent to those skilled in the art. Such modifications are included within the scope of this invention as defined by the following claims.

What is claimed is:

1. A method for improving the sweep efficiency of water, gas, or steam floods by reducing the permeability of higher permeability thief zones of a hydrocarbon bearing subterranean reservoir having heterogeneous and/or fracture permeability and being penetrated by at least one well, said method comprising:
   (a) injecting a controlled quantity of a silicate solution into said well; and
   (b) injecting controlled quantities of a gas and an organic acid that is soluble or dispersible in said gas into said well so that a controlled amount of a silicate gel of a controlled $SiO_2$ concentration is generated in said high-permeability thief zones so that said permeability of said thief zones is reduced.

2. The method of claim 1 wherein said gas and said acid are injected into a second well and produced from said well.

3. The method of claim 1 wherein the pH of said silicate solution is high enough to prevent the generation of a gel prior to the completion of said injection of said gas and said organic acid.

4. The method of claim 1 wherein said silicate solution has a concentration of $SiO_2$ of from 1.1% to 10.0%.

5. The method of claim 1 wherein said silicate solution further comprises a controlled quantity of a base agent so that the pH of said silicate solution is maintained at a high enough level to prevent the generation of a gel prior to said injection of said gas and said organic acid.

6. The method of claim 5 wherein said base agent is selected from the group sodium hydroxide and sodium oxide.

7. The method of claim 1 wherein said organic acid is acetic acid.

8. The method of claim 1 wherein said well is a producing well.

9. The method of claim 1 wherein said well is an injector well.

10. A method for improving the sweep efficiency of gas or steam floods by reducing the permeability of higher permeability thief zones of a hydrocarbon bearing subterranean reservoir having heterogeneous and/or fracture permeability and being penetrated by at least one well, said method comprising:
    (a) injecting a controlled quantity of a silicate solution into said well; and
    (b) injecting controlled quantities of an acidic gas into said well whereby said gas causes a controlled amount of silicate gel of a controlled $SiO_2$ concentration to be generated in said high-permeability thief zones so that said permeability of said thief zones is reduced, wherein said silicate solution further comprises a controlled quantity of a base agent so that the pH of said silicate solution is maintained at a high enough level to prevent the generation of a gel prior to the completion of said injection of said acidic gas and said organic acid.

11. The method of claims 1 or 10 wherein a slug of water is injected into said well to achieve desired reservoir fluid salinity and hardness as an initial step.

12. A method for selective emplacement of a silicate gel into a high-permeability sand through a well wherein said well is a gas flood injector comprising the steps of:
    (a) injecting a controlled quantity of a silicate solution having a controlled pH and a controlled $SiO_2$ concentration into said well;
    (b) injecting a controlled quantity of an organic acid that is miscible with said gas into said well;
    (c) injecting a controlled quantity of said gas so that said acid is dissolved in said gas;
    (d) shutting in said well for a time sufficient to allow in situ gelation; and
    (e) resuming gas injection into said well.

13. A method for selective emplacement of a silicate gel into a high-permeability sand through a gas flood producer well comprising the steps of:
    (a) co-injecting controlled quantities of an organic acid and said gas into said well after gas breakthrough;
    (b) injecting a controlled quantity of a silicate solution having a controlled pH and a controlled $SiO_2$ concentration into said well;
    (c) shutting in said well for a time sufficient to allow in situ gelation; and
    (d) resuming production subsequent to said gelation.

* * * * *